US007014116B2

(12) United States Patent
Craig et al.

(10) Patent No.: US 7,014,116 B2
(45) Date of Patent: Mar. 21, 2006

(54) PRICE VERIFICATION METHOD, DEVICE AND PROGRAM PRODUCT

(75) Inventors: Ronald E. Craig, Pittsboro, NC (US); Haley L. Wilson Gray, Cary, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 10/784,043

(22) Filed: Feb. 20, 2004

(65) Prior Publication Data

US 2005/0184157 A1   Aug. 25, 2005

(51) Int. Cl.
   *G06K 7/10* (2006.01)
(52) U.S. Cl. .................. 235/462.01; 235/383
(58) Field of Classification Search ........... 235/383, 235/472.01, 375, 385, 494, 462, 378, 462.01–462.47, 235/472.02, 472.03, 380, 381; 705/28, 40, 705/23, 1, 20, 38, 39
See application file for complete search history.

(56) References Cited

U.S. PATENT DOCUMENTS

| | | | |
|---|---|---|---|
| 4,758,058 A * | 7/1988 | Cato et al. ............ 359/18 |
| 4,817,185 A * | 3/1989 | Yamaguchi et al. ...... 382/313 |
| 5,054,104 A * | 10/1991 | Yamaguchi ............ 382/309 |
| 5,242,884 A * | 9/1993 | Mando et al. .......... 503/209 |
| 5,250,789 A | 10/1993 | Johnsen |
| 5,361,871 A * | 11/1994 | Gupta et al. ........... 186/61 |
| 5,382,779 A | 1/1995 | Gupta |
| 5,475,603 A * | 12/1995 | Korowotny ............ 700/213 |
| 5,493,107 A * | 2/1996 | Gupta et al. ........... 235/383 |
| 5,640,002 A | 6/1997 | Ruppert et al. |
| 5,794,211 A | 8/1998 | Goodwin, III et al. |
| 6,073,843 A | 6/2000 | Goodwin, III et al. |
| 6,301,565 B1 | 10/2001 | Goodwin, III |
| 6,507,279 B1 | 1/2003 | Loof |
| 6,641,037 B1 | 11/2003 | Williams |
| 2002/0116274 A1 * | 8/2002 | Hind et al. ............ 705/23 |
| 2002/0117544 A1 | 8/2002 | Wolfe et al. |
| 2002/0128859 A1 * | 9/2002 | Perkowski ............ 705/1 |
| 2002/0174040 A1 * | 11/2002 | Hurt et al. ............ 705/28 |

* cited by examiner

*Primary Examiner*—Thien M. Le
(74) *Attorney, Agent, or Firm*—Hoffman, Warnick & D'Alessandro, LLC

(57) ABSTRACT

The price verification device typically includes a barcode scanner, an Optical Character Recognition (OCR) reader and an optional key pad. To verify a price for an item, a user such as a consumer will scan a barcode printed on a label associated with the item using the barcode scanner, and read the price for the item as printed on the label using the OCR reader. The consumer can then optionally input a quantity for the item using the key pad. Thereafter, the final price for the item will be stored within the device. When the consumer checks-out, he/she can compare the stored price for the item to a register-based price as determined by a (cash) register.

28 Claims, 5 Drawing Sheets

FIG. 3

Item Description  Stock #

$2.99

16 cents/ oz 1 234567 890123

FIG. 5

| ITEM | PRICE |
|------|-------|
| ITEM 1 | $3.00 |
| ITEM 2 | $12.75 |
| ITEM 3 | $3.98 |
| ITEM 4 | $1.76 |
| ITEM 5 | $7.36 |
| ITEM 6 | $4.27 |

THANK YOU FOR SHOPPING WITH GROCERY MART.

HAVE A NICE DAY!

PRICE VERIFICATION METHOD, DEVICE AND PROGRAM PRODUCT

BACKGROUND OF THE INVENTION

1. Field of the Invention

The present invention generally relates to a price verification method, device and program product. Specifically, the present invention provides an automated way for a consumer to compare a listed or advertised price for an item to a register-based price as determined by a cash register or the like.

2. Related Art

In the retail world, it is often the case that prices listed for items are inaccurate. Specifically, many consumers have experienced instances where a price listed for an item does not match the actual price charged. The inaccuracies can not only occur in advertisements, but in the retail store as well. For example, a consumer might observe one price on a label associated with an item (e.g., a label affixed to the item or on the shelf that holds the item), but be charged a different price when checking out of the retail store. Studies have shown that when such price discrepancies occur, the consumer is more likely to suffer a loss than a gain. Expecting the consumer to remember listed prices for all items they intend to purchase is neither convenient nor realistic.

To date, many devices have been developed for enhancing a consumer's shopping experience. For example, U.S. Pat. No. 5,250,789 discloses a device that allows a shopper to enter a shopping list and then check off items with a barcode scanner. U.S. Pat. No. 5,424,524 shows a device that allows shoppers to scan items as they shop and then integrate with the store's database to obtain the prices. Still yet, U.S. Pat. No. 5,640,002 shows a device with a barcode scanner that is integrated with a store's database. Unfortunately, none of the previous attempts provides a way to verify a store's price against a listed (printed) price. Specifically, the previous attempts typically rely on a store's database. As such, there is no way of verifying whether the store's database price matches a listed price for an item.

In view of the foregoing, there exists a need for a price verification method, device and program product. Specifically a need exists for a device that is capable of both scanning a barcode printed on a label associated with an item, and reading a price for the item as printed on the label. A further need exists for the price to be stored within the device for later comparison to a register-based price. Another need exists for the comparison to be made manually by a consumer, or automatically by the device. In the case of the latter, a need exists for the device to be able to read the register-based price from a receipt, or for the device to be capable of communicating with the register.

SUMMARY OF THE INVENTION

In general, the present invention provides a price verification method, device and program product. Specifically, under the present invention, the price verification device typically includes a barcode scanner, an Optical Character Recognition (OCR) reader and an optional key pad. To verify a price for an item, a consumer will scan a barcode printed on a label associated with the item using the barcode scanner, and read the price for the item as printed on the label using the OCR reader. The consumer can then optionally input a quantity for the item using the key pad. Thereafter, the final price for the item will be stored within the device. When the consumer checks-out, he/she can compare the stored price for the item to a register-based price as determined by a (cash) register. Under the present invention, the comparison can be made by manually comparing the receipt against the final price stored in the device. Alternatively, the device itself can perform the comparison. In the case of the latter, the comparison can be made by reading the register-based price from the receipt using the OCR reader, or by placing the device in communication with the register to receive the register-based price.

A first aspect of the present invention provides a price verification method, comprising: providing a price verification device having a barcode scanner and an Optical Character Recognition (OCR) reader; scanning a barcode corresponding to an item as printed on a label associated with the item using the barcode scanner; reading a price for the item as printed on the label using the OCR reader; storing the price for the item within the price verification device; and comparing the stored price to a register-based price for the item as determined by a register to verify an accuracy of the stored price.

A second aspect of the present invention provides a price verification device, comprising: a barcode scanner for scanning a barcode corresponding to an item as printed on a label associated with the item; an optical character recognition (OCR) reader for reading a price for the item printed on the label; and a storage unit for storing the price for the item as read by the OCR reader for comparison to a register-based price for the item as determined by a register.

A third aspect of the present invention provides a price verification device, comprising: a barcode system for controlling a barcode scanner on the device that scans a barcode corresponding to an item from a label associated with the item; an Optical Character Recognition (OCR) system for controlling an OCR reader of the device that reads a price for the item from the label; and a storage system for storing the price for comparison to a register-based price for the item as determined by a register.

A fourth aspect of the present invention provides a program product stored on a recordable medium for verifying a price of an item, which when executed, comprises: program code for controlling a barcode scanner on the device that scans a barcode corresponding to an item from a label associated with the item; program code for controlling an Optical Character Recognition (OCR) reader of the device that reads a price for the item from the label; and program code for storing the price for comparison to a register-based price for the item as determined by a register.

Therefore, the present invention provides a price verification method, device and program product.

BRIEF DESCRIPTION OF THE DRAWINGS

These and other features of this invention will be more readily understood from the following detailed description of the various aspects of the invention taken in conjunction with the accompanying drawings in which:

FIG. 3 depicts an illustrative label associated with an item according to the present invention.

FIG. 5 depicts an exemplary receipt according to the present invention.

Figure 1:
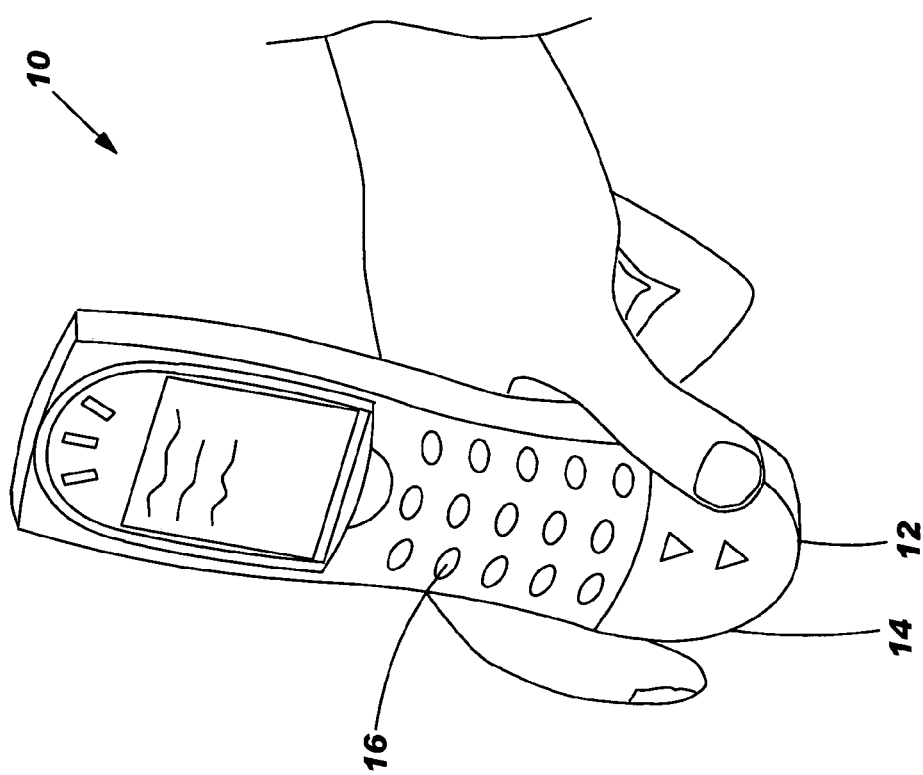
FIG. 1 depicts an price verification device according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a price verification method, device and program product. Specifically, under the present invention, the price verification device typically includes a barcode scanner, an Optical Character Recognition (OCR) reader and an optional key pad. To verify a price for an item, a consumer will scan a barcode printed on a label associated with the item using the barcode scanner, and read the price for the item as printed on the label using the OCR reader. The consumer can then optionally input a quantity for the item using the key pad. Thereafter, the final price for the item will be stored within the device. When the consumer checks-out, he/she can compare the stored price for the item to a register-based price as determined by a (cash) register. Under the present invention, the comparison can be made by manually comparing the receipt against the final price stored in the device. Alternatively, the device itself can perform the comparison. In the case of the latter, the comparison can be made by reading the register-based price from the receipt using the OCR reader, or by placing the device in communication with the register to receive the register-based price.

Referring now to FIG. 1, an illustrative price verification device (hereinafter "device") 10 according to the present invention is shown. As shown in FIG. 1, the teachings of the present invention could be incorporated within a cellular telephone. However it should be appreciated that this need not be the case. For example, device 10 could be a personal digital assistant or any other type of portable device. In any event, under the present invention device 10 includes barcode reader 12 and Optical Character Recognition (OCR) reader 14. As will be further described in conjunction with FIG. 2, device 10 could also include a receiver for receiving signals from other electronic devices such as a cash register. Device 10 is also shown including an optional key pad 16 to allow a consumer to input a quantity corresponding to a purchased item. The functions of these features will be further described below in conjunction with FIGS. 2–5. It should also be appreciated that bar code scanner 12 and OCR reader 14 can be implemented as separate components (as shown in FIG. 2), or they could be implemented as a single component on device 10.

Figure 2:
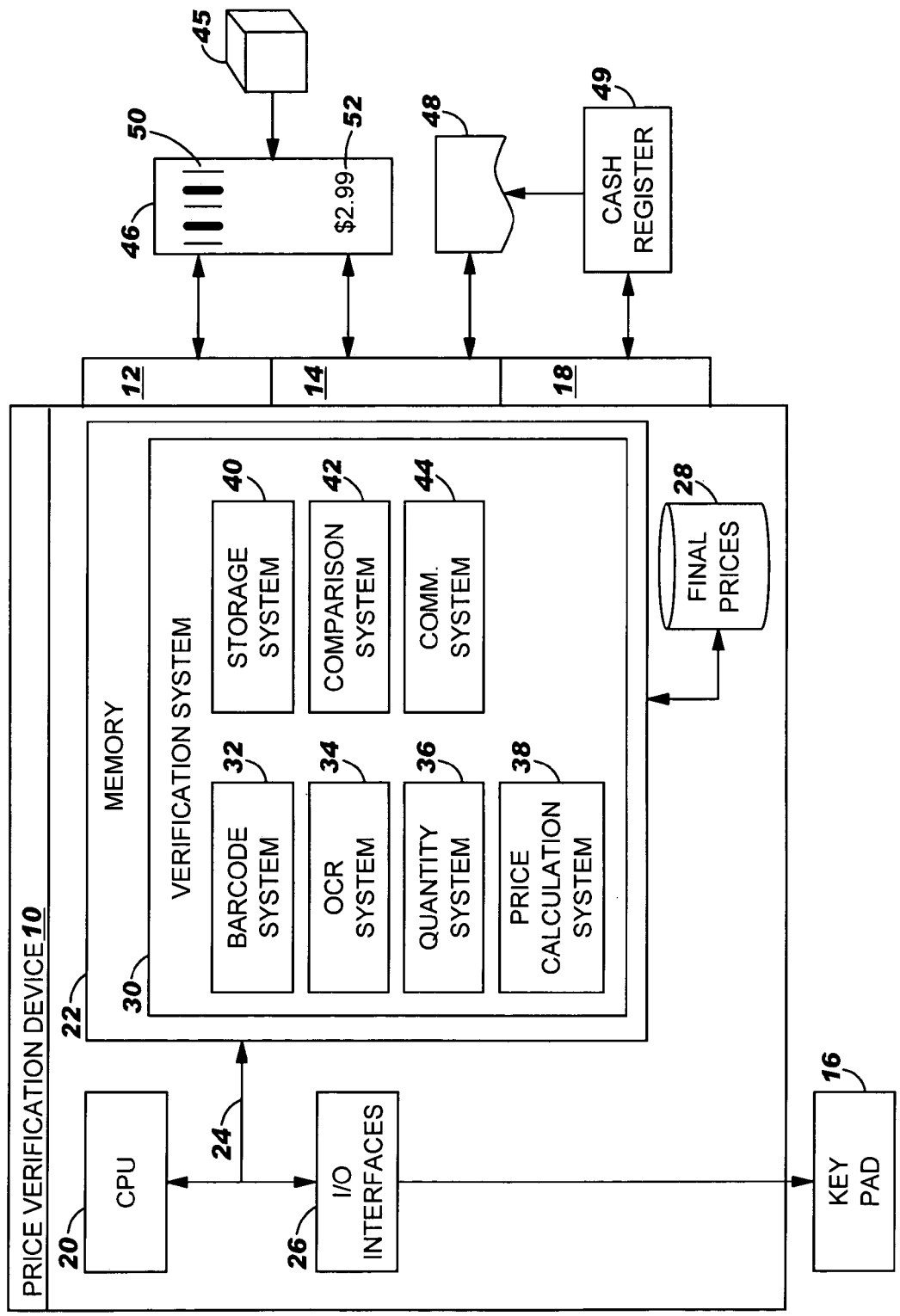
FIG. 2 depicts the device of FIG. 1 in greater detail.

Referring now to FIG. 2, device 10 is shown in greater detail. As depicted, device 10 generally comprises key pad 16, central processing unit (CPU) 20, memory 22, bus 24, input/output (I/O) interfaces 26 and storage unit 28. CPU 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source such as key pad 16. In addition, although not shown, other external devices/resources such as speakers, a CRT, LCD screen, handheld device, keyboard, mouse, voice recognition system, speech output system, printer, monitor/display may be incorporated into device 10. Bus 24 provides a communication link between each of the components in device 10 and likewise may comprise any known type of transmission link, including electrical, optical, wireless, etc.

Storage unit 28 can be any system (e.g., database) capable of providing storage for information under the present invention. Such information could include, for example, final prices, etc. As such, storage unit 28 could include one or more storage devices, such as a magnetic disk drive or an optical disk drive. Although not shown, additional components, such as cache memory, communication systems, system software, etc., may be incorporated into device 10.

Shown in memory 22 of device 10 as a program product is verification system 30, which includes barcode system 32, OCR system 34, quantity system 36, price calculation system 38, storage system 40, comparison system 42 and communication system 44. Although these systems will be further described below, it should be generally understood that barcode system 32 contains the program code/logic necessary for controlling barcode scanner 12, while OCR system 34 contains the program code/logic for controlling OCR reader 14 and for converting the readings taken thereby into standard characters. As such, systems 32 and 34 could incorporate the teachings of any barcode or OCR software now known or later developed.

In any event, when a consumer wishes to purchase an item 45, he/she will first locate a label 46 associated with item 45. Label 46 can be an advertisement, a label affixed to the item, a label positioned on a shelf holding item 45 in the retail store, etc. In general, label 46 will include a barcode 50 that specifically identifies item 45 as well as a price 52 corresponding thereto. Referring to FIG. 3, label 46 is shown in greater detail. As more clearly depicted, label 46 includes printed barcode 50 and printed price 52.

Figure 4:
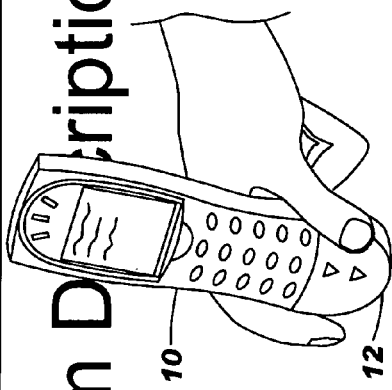
FIG. 4 depicts the device of FIGS. 1 and 2 as used to scan and read the label of FIG. 3 according to the present invention.

Referring to FIG. 4, once label 46 has been located, the consumer will scan barcode 50 using barcode scanner 12 of device 10. The scanned image will be received and recognized by barcode system 32 (FIG. 2). The consumer will also read price 52 for item 45 (FIG. 2) that is printed on label 46 using OCR reader 14. As indicated above, OCR system 34 (FIG. 2) will convert the reading into actual characters. Once barcode 50 has been scanned and price 52 has been read, the consumer can then optionally input a quantity for item 45 using key pad 16 (if device 10 includes key pad 16). If a quantity is input, it will be received by quantity system 36 (FIG. 2).

Referring back to FIG. 2, after the consumer has performed these functions, price calculation system 38 will compute a final price for item 45 based on the read price 52 and the quantity input (if any). If the consumer has not input a quantity, the final price will be price 52 as determined by OCR reader 14 and OCR system 34 (e.g., $2.99). Alternatively, if the consumer has input a quantity, price calculation system 38 will calculate the final price by multiplying price 52 by the input quantity. For example, if the consumer input a quantity of four (4), the final price would be as follows:

$$\$2.99*4=\$11.96$$

In any event, once the final price is known, storage system 40 will store the same in storage unit 28.

At this point, the consumer is ready to verify whether the price on label 46 is correct. Specifically, when consumer checks out via cash register 49, the register-based price of item 45 (i.e., as printed on receipt 48 generated by cash register 49) will be compared with the final price as stored in storage unit 28. Specifically, referring to FIG. 5, receipt 48 is shown in greater detail. As depicted, receipt 48 lists a set of items 60 purchased by the consumer as well as their corresponding register-based prices 62. Under the present invention, register-based prices 62 would be compared against the final prices for set of items 60 as stored in storage unit 28. Assume in this example that "Item 1" on receipt 48 corresponds to item 45 of FIG. 2. Further assume that the final price for item 45 was $2.99 (a quantity of "1"). In this case, a price discrepancy exists to the detriment of the consumer. Under the present invention, the discrepancy would be detected by comparing the register-based price printed on receipt 48 to the final price stored in device 10.

Referring back to FIG. 2, the comparison can be made in a number of ways. In one embodiment, the consumer will obtain receipt 48 as printed by cash register 49 and manually compare the register-based price for item 46 printed thereon to the final price stored in device 10. In another embodiment, consumer can read the register-based price printed on receipt 48 using OCR reader 14 and OCR system 34. Once the register-based price has been received, comparison system 42 can make the comparison automatically and inform the consumer if a discrepancy exists.

In still yet another embodiment, device 10 can communicate with cash register 49 directly. In this case, the communication between device 10 and cash register 49 can occur through a wireless connection, or via a hardwired connection. For example, in the case of the former, device 10 could include a receiver 18 for receiving information from cash register 49. The price information could be received by communication system 44 and passed to comparison system 42 for the comparison against the final price as stored in storage unit 28. This type of wireless communication could be implemented similar to the known manner in which personal digital assistants and other wireless devices exchange information with each other (commonly known as "beaming"). For a hardwired connection, cash register 49 could include a docking port or cradle into which device 10 is "plugged" or "docked." Once a connection has been established, the register-based price information could be communicated to device 10 via communication system 44.

The present invention thus provides numerous advantages over previous embodiments. Specifically, not only can it be used to track price discrepancies between a list price and a price actually charged, but it can also be used to track price increases or decreases, find un-advertised sales, track pricing differentiation among stores, etc.

It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the illustrative representation of verification system 30 shown in FIG. 2 is not intended to be limiting. That is, the functions of the present invention described herein could be represented by a different configuration of systems.

The invention claimed is:

1. A price verification method, comprising:
   providing a portable price verification device having a barcode scanner and an Optical Character Recognition (OCR) reader;
   scanning a barcode corresponding to an item as printed on a label associated with the item using the barcode scanner;
   reading a price for the item as printed on the label using the OCR reader;
   storing the price for the item within the price verification device; and
   comparing the stored price to a register-based price for the item as determined by a register to verify an accuracy of the stored price.

2. The method of claim 1, wherein the price verification device further comprises a key pad, and wherein the method further comprises:
   inputting a quantity for the item using the key pad;
   computing a final price for the item based on the quantity, wherein the stored price is the final price.

3. The method of claim 1, wherein the comparing step comprises:
   providing a receipt for the item as generated by the register, wherein the receipt lists the register-based price for the item; and
   comparing the stored price to the register-based price for the item.

4. The method of claim 3, wherein the comparing step comprises manually comparing the stored price to the register-based price for the item as listed on the receipt.

5. The method of claim 3, wherein the comparing step comprises:
   scanning the register-based price for the item as printed on the receipt using the OCR reader;
   comparing the register-based price to the stored price within the price verification device.

6. The method of claim 1, wherein to comparing step comprises:
   receiving the register-based price for the item within the price verification device from the register; and
   comparing the stored price to the register-based price within the price verification device.

7. The method of claim 6, wherein the register-based price is received from the register through a wireless connection between the register and the price verification device.

8. The method of claim 6, further comprising docking the price verification device with the register to receive the register-based price within the price verification device.

9. A portable price verification device, comprising:
a barcode scanner for scanning a barcode corresponding to an item as printed on a label associated with the item;
an optical character recognition (OCR) reader for reading a price for the item printed on the label; and
a storage unit for storing the price for the item as read by the OCR reader for comparison to a register-based price for the item as determined by a register.

10. The device of claim 9, further comprising:
a key pad for inputting a quantity for the item using the key pad; and
a price calculation system for calculating a final price for the item based on the price read by the OCR reader and the quantity, wherein the final price is stored in the storage unit.

11. The device of claim 9, further comprising a comparison system for comparing the price stored in the storage unit to the register-based price for the item.

12. The device of claim 11, wherein the OCR reader further reads the register-based price for the item from a receipt printed by the register, and wherein the comparison system compares the register-based price as read by the OCR reader to the stored price within the storage unit.

13. The device of claim 9, wherein the register-based price is received from the register through a wireless connection between the register and the price verification device.

14. The device of claim 9, wherein the register-based price is received from the register through a hardwired connection between the register and the price verification device.

15. The device of claim 9, wherein the barcode scanner and the OCR reader are implemented within a single component.

16. The device of claim 9, wherein the barcode scanner and the OCR reader are implemented as separate components.

17. A portable price verification device, comprising:
a barcode system for controlling a barcode scanner on the device that scans a barcode corresponding to an item from a label associated with the item;
an Optical Character Recognition (OCR) system for controlling an OCR reader of the device that reads a price for the item from the label; and
a storage system for storing the price for comparison to a register-based price for the item as determined by a register.

18. The device of claim 17, further comprising:
a key pad for inputting a quantity for the item; and
a price calculation system for calculating a final price for the item based on the price read by the OCR reader and the quantity, wherein the final price is stored in the storage unit.

19. The device of claim 17, further comprising a comparison system for comparing the price stored in the storage unit to the register-based price for the item.

20. The device of claim 19, wherein the OCR reader further reads the register-based price for the item from a receipt printed by the register, and wherein the comparison system compares the register-based price as read by the OCR reader to the stored price in the storage unit.

21. The device of claim 17, wherein the register-based price is received from the register through a wireless connection between the register and the price verification device.

22. The device of claim 17, wherein the register-based price is received from the register through a hardwired connection between the register and the price verification device.

23. A program product stored on a recordable medium for verifying a price of an item, which when executed, comprises:
program code for controlling a barcode scanner on a portable device that scans a barcode corresponding to an item from a label associated with the item;
program code for controlling an Optical Character Recognition (OCR) reader of the device that reads a price for the item from the label; and
program code for storing the price for comparison to a register-based price for the item as determined by a register.

24. The program product of claim 23, further comprising program code for calculating a final price for the item based on the price read by the OCR reader and an input quantity, wherein the final price is stored in the storage unit.

25. The program product of claim 23, further comprising program code for comparing the price stored in the storage unit to the register-based price for the item.

26. The program product of claim 25, wherein the OCR reader further reads the register-based price for the item from a receipt printed by the register, and wherein the program code for comparing compares the register-based price as read by the OCR reader to the stored price in the storage unit.

27. The program product of claim 23, wherein the register-based price is received from the register through a wireless connection between the register and the price verification device.

28. The program product of claim 23, wherein the register-based price is received from the register through a hardwired connection between the register and the price verification device.

* * * * *

UNITED STATES PATENT AND TRADEMARK OFFICE
CERTIFICATE OF CORRECTION

| | |
|---|---|
| PATENT NO. | : 7,014,116 B2 |
| APPLICATION NO. | : 10/784043 |
| DATED | : March 21, 2006 |
| INVENTOR(S) | : Craig et al. |

It is certified that error appears in the above-identified patent and that said Letters Patent is hereby corrected as shown below:

Claim 6, Column 6, Line 58 please take out "to" and insert --the--.

Signed and Sealed this

Fourth Day of July, 2006

JON W. DUDAS
*Director of the United States Patent and Trademark Office*